3,226,371
Patented Dec. 28, 1965

3,226,371
REGULATION OF BUTADIENE-ACRYLONITRILE POLYMERIZATION USING A MIXTURE OF DECYL AND UNDECYL SECONDARY AND TERTIARY MERCAPTANS
Benjamin S. Garvey, Jr., Strafford Village, Harry E. Albert, Lafayette Hill, and Alfred C. Whiton, Norristown, Pa., assignors to Pennsalt Chemicals Corporation, Philadelphia, Pa., a corporation of Pennsylvania
No Drawing. Filed July 17, 1961, Ser. No. 124,319
5 Claims. (Cl. 260—82.7)

This invention deals with the preparation of nitrile rubber as obtained from an acrylonitrile and butadiene and is particularly concerned with the use of decyl and undecyl mercaptans as modifiers in such synthetic rubber polymerization processes.

It is old in the art to use mercaptans as modifiers in the emulsion polymerization of olefinic monomers to obtain elastomeric products. Such polymerization modifiers are substances which are included in a polymerization recipe to make possible the production of a plastic, workable polymer. With no modifier present in the recipe a tough, unworkable polymer is produced. The exact role which the modifier plays in a free-radical initiated polymerization has been the subject of much study, especially in butadiene-styrene emulsion copolymerization systems and it has been established that the modifier functions primarily as a chain transfer agent in a free radical mechanism, and in this manner it controls the molecular weight (and hence the processability) of the polymer.

Wollthan, in his U.S. Patent 2,281,613, disclosed that control of the polymerization is provided and plasticity of the polymers obtained by incorporating in the aqueous emulsion an aliphatic mercaptan having at least six carbon atoms in an aliphatic linkage. In U.S. 2,378,080 Olin disclosed his improvement in the use of aliphatic mercaptans having between 8 and 16 carbon atoms and pointed out the particular advantage of high efficiency in the use of tertiary-dodecyl mercaptan as obtained by condensation of triisobutylene with hydrogen sulfide. Additional study in the use of mercaptan modifiers resulted in additional advances. For example, Crouch and Mashofer describe in U.S. Patents 2,549,961 and 2,549,962 the advantage of using blends of tertiary-alkyl mercaptans having 8 to 16 carbon atoms per molecule. In actual practice, however, the synthetic rubber industry has relied on a limited number of modifiers, using preferably tertiary-dodecyl mercaptan and, when mixtures of mercaptans were desired, a commercial mixture consisting of tertiary mercaptans containing 12, 14 and 16 carbon atoms. Further, it has been the practice to consider mercaptan modifiers useful for one rubber polymerization system as equally useful in other systems where different comonomers are used to produce a different type rubber. Thus, mercaptan modifiers used in styrene-butadiene (SBR) systems were considered equally useful in acrylonitrile-butadiene (NBR) polymerization systems.

Now, however, it has been found that mercaptan modifiers are not equivalent in their application to SBR and NBR emulsion polymerization systems. Surprisingly, in accord with this invention, significant improvements are obtained in polymerization recipes for an acrylonitrile-butadiene rubber when a modifier is employed which is a mercaptan containing 10 or 11 carbon atoms in its molecule and these improvements result also when the modifier used is a mixture of decyl and undecyl mercaptans. This is entirely unexpected in view of the fact that neither decyl nor undecyl mercaptan or a mixture of these mercaptans is of significant advantage when used as modifier in the emulsion polymerization of styrene and butadiene systems under similar polymerization conditions.

A particular advantage found in using decyl or undecyl mercaptan as modifier in nitrile rubber polymerization recipes is that improved modifier efficiency is obtained. Modifier efficiency can be empirically measured in a synthetic rubber polymerization system by measuring the Mooney viscosity of the dry polymer produced from such a system. At a given concentration level in the system, a modifier which produces a soft (low Mooney viscosity) polymer is classified as more efficient than a modifier which produces a stiff (high Mooney viscosity) polymer. The processability of a polymer is dependent upon its viscosity and an efficient modifier is desired in synthetic rubber recipes, since less of it will be required to produce a polymer of specified Mooney viscosity.

In order to facilitate discussion of the mercaptans they will be referred to as $C_x$ mercaptans where C refers to a hydrocarbon radical and $x$ is the number of carbon atoms per molecule. Thus, $C_9$ is nonyl mercaptan, $C_{10}$ is decyl mercaptan, $C_{11}$ is undecyl mercaptan, etc. The $C_{10}$ and $C_{11}$ mercaptans used in accord with the invention have highly branched alkyl chains and are predominantly secondary and tertiary mercaptans. These compounds are readily prepared in accord with the known methods for the addition of $H_2S$ to olefins. Reference is made to U.S. 2,392,554 for details of the mercaptan preparation process.

It will be understood that the $C_{10}$ and $C_{11}$ mercaptans are not discrete compounds, but comprise isomer mixtures. As indicated above, however, the components are predominantly secondary and tertiary mercaptans and the purity of the rectified fractions will be on the order of 90% to 100% mercaptan by weight. It will also be understood that the term "$C_{10}$ mercaptan" refers to a fraction consisting essentially of decyl mercaptan, but there will also be present small amounts of $C_{11}$ mercaptan and probably some trace quantities of other mercaptans. Likewise the term "$C_{11}$ mercaptan" refers to a fraction consisting essentially of undecyl mercaptan with decyl and other mercaptans present in very small amounts. The $C_{10}$ and $C_{11}$ mercaptan mixtures will also be of a comparable purity and will contain the $C_{10}$ and $C_{11}$ mercaptan components in weight ratios ranging from about 10:90 to 90:10. Because of availability, the preferred $C_{10}$ and $C_{11}$ mixture will consist essentially of approximately equal amounts of $C_{10}$ and $C_{11}$ mercaptan and such a mixture is preferred because it has been found to have somewhat higher modifier efficiencies than mixtures with other proportions of $C_{10}$ and $C_{11}$ mercaptans. As indicated the mercaptans are prepared by reaction of $H_2S$ with the appropriate olefins and since different sources of olefins will contain somewhat different proportions of components, the mercaptan products will vary accordingly. Complete purification is neither practical nor necessary, however. The following Table A indicates the physical properties of the $C_{10}$ and $C_{11}$ mercaptans as obtained from two olefin sources:

TABLE A

|  | Properties of mercaptan | | |
|---|---|---|---|
|  | $C_{10}SH$ and $C_{11}SH$ Mixture Distillation range | $C_{10}SH$ Fraction Distillation range | $C_{11}SH$ Fraction Distillation range |
| Source A: $C_8$—0.8% $C_9$—1.5% $C_{10}$—43.9% $C_{11}$—44.7% $C_{12}$—9.1% | 76°–90° C. at 5 mm.; Refr. Index=$n_D^{25}$= 1.4575; percent Sulfur —17.7. | 90°–104.5° C. at 15 mm.; Refr. Inedx=$n_D^{25}$= 1.4562; percent S=18.1. (Theory=18.4). | 78°–82° C. at 4 mm.; Refr. Index=$n_D^{25}$= 1.4578; percent S=17.3. (Theory=17.0). |
| Source B: $C_8$—4% $C_9$—15% $C_{10}$—53% $C_{11}$—25% $C_{12}$—3% | 89°–112° C. at 20 mm.; Refr. Index=$n_D^{25}$= 1.4569; percent S=17.7. | 96°–105° C. at 15 mm.; Refr. Index=$n_D^{25}$= 1.4570; percent S–18.2. |  |

As indicated, the $C_{10}$ and $C_{11}$ mercaptans will be used in accord with this invention in nitrile rubber polymerization recipes, the monomers employed for the elastomer preparation being a diene such as butadiene and isoprene, and a comonomer such as acrylonitrile or methacrylonitrile. In the actual polymerization procedure, normal polymerization ingredients and the usual operating techniques will be employed except that the mercaptan modifier will be a $C_{10}$, a $C_{11}$, or a mixture of $C_{10}$ and $C_{11}$ mercaptans. The amount of modifier used will be in accord with usual practice and will vary from about 0.20–0.60 part per hundred parts of monomer. Less than this amount of modifier results in too stiff a polymer product whereas more than about 0.60 p.h.m. causes too great a softening of the polymer. Preferably, from about 0.3 to 0.5 p.h.m. will be used. The standard procedures for nitrile rubber manufacture are discussed by Whitby in his book "Synthetic Rubber," John Wiley and Sons, 1954.

In order to further illustrate the invention the following examples are given:

EXAMPLE I-A

Acrylonitrile-butadiene copoylmers were prepared by polymerization at 104° F. according to the following NBR recipe:

| Ingredients: | Parts by weight |
|---|---|
| Butadiene | 72 |
| Acrylonitrile | 28 |
| Water | 180 |
| Sodium fatty acid soap | 4.5 |
| Stearic acid | 0.6 |
| Mercaptan | Variable |
| KCl | 0.3 |
| $K_4P_2O_7$ | 0.1 |
| $Fe_2(SO_4)_3$ | 0.02 |
| $K_2S_2O_8$ | 0.4 |

The mercaptans used were a mixture of essentially 50:50 parts by weight of $C_{10}$ and $C_{11}$ mercaptans which were compared with a control polymer in which the modifier was a tertiary dodecyl mercaptan. A separate control polymer was used for comparison in each case in order to overcome any differences due to polymerization technique in the batch polymerization employed. Results are determined by comparing Mooney viscosity values and the fairest comparison of these various mercaptans is achieved by comparing the difference in Mooney viscosity between the experimental and the control polymer. Mooney viscosity values were determined in the usual manner at 212° F. on the uncompounded polymer after (a) one minute preheat plus four and (b) one minute preheat plus ten minutes operation of the large rotor. The values obtained where then added to give the values in the table which follows:

TABLE I-A

*Comparison of 50:50 $C_{10}$ and $C_{11}$ mercaptans mixture with tertiary dodecyl mercaptan for NBR recipe*

| Mercaptan modifier (p.h.m.)[1] | Rate data | | Mooney viscosity | |
|---|---|---|---|---|
|  | Time, hrs. | Conversion, percent | ML 1'+4' | ML 1'+10' |
| $C_{10}SH+C_{11}SH$ (0.40) | 1.5 3.0 4.0 5.5 | 25.7 50.1 60.4 74.0 | 27.5 | 22.5 |
| $C_{12}SH$[2] (0.40) | 1.5 3.0 4.0 5.5 | 24.9 50.0 60.6 74.4 | 46.5 | 37.0 |
| $C_{12}SH$[3] (0.40) | 1.5 3.0 4.0 5.5 | 26.5 50.2 60.0 73.9 | 55.5 | 44.0 |
| $C_{10}SH+C_{11}SH$ (0.30) | 1.5 3.0 4.0 5.5 | 24.5 48.8 61.7 74.2 | 71.0 | 57.5 |
| $C_{12}SH$[2] (0.30) | 1.5 3.0 4.0 5.5 | 22.4 51.3 62.7 75.5 | 85.0 | 73.5 |
| $C_{12}SH$[3] (0.30) | 1.5 3.0 4.0 5.5 | 24.6 48.0 60.2 72.0 | 100.0 | 97.5 |
| $C_{10}SH+C_{11}SH$ (0.285) | 1.5 3.0 4.0 6.5 | 23.3 44.4 57.4 75.1 | 89.9 | 84.0 |
| $C_{10}SH+C_{11}SH$ (0.27) | 1.5 3.0 4.0 6.5 | 22.0 48.0 57.2 76.1 | 96.0 | 91.0 |
| $C_{12}SH$[2] (0.30) | 1.5 3.0 4.0 6.0 | 24.3 48.3 55.6 77.5 | 95.0 | 90.5 |

[1] p.h.m.=parts per one hundred parts of total monomers.
[2] Prepared by reaction of $H_2S$ with propylene tetramer.
[3] Prepared by reaction of $H_2S$ with butylene trimer.

It is clear from the above data that the efficiency of the $C_{10}$ and $C_{11}$ mercaptan mixture is greater than the heretofore commercially used $C_{12}$ mercaptan. The latter part of the table also indicates that the $C_{10}$ and $C_{11}$ mercaptan mixture is more efficient to an extent of about 10% and this improved efficiency represents a definite advantage in nitrile rubber manufacture.

In contrast to the above improvement obtained in an NBR system, the following Example I-B illustrates the failure of a mixture of $C_{10}$ and $C_{11}$ mercaptans to improve a hot SBR recipe.

EXAMPLE I-B

A rubber was prepared from styrene and butadiene by polymerization at 122° F. of the following SBR-1000 recipe:

| Ingredients: | Parts by weight |
|---|---|
| Butadiene | 72 |
| Styrene | 28 |
| Water | 180 |
| Mercaptan | 0.30 |
| Sodium fatty acid soap | 4.7 |
| $K_2S_2O_8$ | 0.40 |

The mercaptans used were an essentially 50:50 mixture of $C_{10}$ and $C_{11}$ mercaptan and a commercially available $C_{12}$ mercaptan derived from propylene tetramer. As in previous examples, Mooney viscosity data were used to evaluate the modifier efficiencies. Table I-B lists the time of polymerization, the percent conversion, and Mooney viscosity data.

TABLE I-B

*Efficiency of various mercaptans in SBR-1000 rubber recipes*

| Mercaptan modifier (0.30 p.h.m.) | Rate data | | Mooney viscosity data | |
|---|---|---|---|---|
| | Polymerization time, hrs. | Percent conversion | ML 1'+4' | ML 1'+10' |
| $C_{10}SH+C_{11}SH$ | 2.0<br>4.0<br>6.0<br>7.75 | 10.3<br>26.7<br>44.2<br>56.8 | 19.5 | 16.0 |
| $C_{12}SH$ | 2.0<br>4.0<br>6.0<br>7.75 | 10.7<br>26.7<br>43.6<br>55.8 | 21.0 | 17.5 |
| $C_{10}SH+C_{11}SH$ | 2.5<br>5.0<br>8.0<br>9.25 | 19.2<br>39.5<br>64.6<br>72.2 | 39.0 | 32.0 |
| $C_{12}SH$ | 2.5<br>5.0<br>8.0<br>9.25 | 19.3<br>39.6<br>64.7<br>71.3 | 40.0 | 32.5 |

It is quite evident from Table I-B that with SBR-1000 rubber recipes, the $C_{10}$ and $C_{11}$ mercaptans are not significantly better than the commercially available $C_{12}$ mercaptan. Thus, it is clear that the present invention is limited to the use of $C_{10}$ and $C_{11}$ mercaptans in nitrile polymerization systems.

EXAMPLE II

In accord with the recipe and details of Example I-A a nitrile rubber was prepared and modified with decyl, undecyl and a mixture of approximately 50:50 parts by weight of decyl and undecyl mercaptans. Table II indicates the results obtained:

TABLE II

| Modifier (0.30 p.h.m.) | Rate data | | Mooney viscosity | |
|---|---|---|---|---|
| | Time, hrs. | Percent conversion | ML 1'+4' | ML 1'+10' |
| $C_{10}SH$ | 1.5<br>3.0<br>4.0<br>6.0 | 24.9<br>49.6<br>61.5<br>75.6 | 81.0 | 72.0 |
| $C_{11}SH$ | 1.5<br>3.0<br>4.0<br>6.0 | 25.1<br>50.5<br>62.8<br>77.6 | 87.0 | 79.0 |
| $C_{10}SH+C_{11}SH$ | 1.5<br>3.0<br>4.0<br>5.5 | 26.7<br>52.6<br>65.1<br>74.7 | 76.0 | 64.0 |

It is evident from the above table that the $C_{10}$ and $C_{11}$ mercaptan mixture is somewhat more efficient than the individual $C_{10}$ and $C_{11}$ fractions. Also evident is that $C_{10}SH$ is somewhat more efficient than $C_{11}SH$.

It will be understood that this invention may be practiced to obtain certain advantages by combining the $C_{10}$, $C_{11}$ or mixtures of $C_{10}$ and $C_{11}$ mercaptans with other modifiers. Thus, for example, this invention may be used to upgrade an inefficient modifier by the addition of $C_{10}SH$, $C_{11}SH$ or their mixture. It will be further understood that the skilled art worker may make various changes from the above description and examples without departing from the spirit and scope of the invention.

We claim:

1. In the process of copolymerizing an acrylonitrile and a butadiene in an aqueous emulsion system to produce a nitrile rubber the improvement which comprises modifying said polymerization with from about 0.2 to about 0.6 part per one hundred parts of monomers of a mercaptan modifier comprising a mixture of decyl and undecyl mercaptans in a weight ratio of 10:90 to 90:10, said decyl and undecyl mercaptans consisting essentially of secondary and tertiary mercaptans.

2. In the process of copolymerizing acrylonitrile and butadiene in an aqueous emulsion system to produce a nitrile rubber, the improvement which comprises modifying said polymerization with from about 0.3 to 0.5 part per one hundred parts of monomers of a mercaptan modifier comprising a mixture of essentially equal parts by weight of decyl and undecyl mercaptans, said decyl and undecyl mercaptans consisting essentially of secondary and tertiary mercaptans.

3. A nitrile rubber prepared by copolymerizing an acrylonitrile and a butadiene in an aqueous emulsion system containing a mercaptan modifier in an amount from about 0.2 to about 0.6 part per 100 parts of monomers, said modifier being selected from the group consisting of the secondary and tertiary isomers of decyl and undecyl mercaptan.

4. A nitrile rubber prepared by copolymerizing acrylonitrile and butadiene in an aqueous emulsion system containing as modifier from about 0.3 to about 0.5 part per one hundred parts of monomers of a mixture of decyl and undecyl mercaptans in a weight ratio of 10:90 to 90:10, said mercaptans consisting essentially of secondary and tertiary mercaptans.

5. A rubber obtained by copolymerizing acrylonitrile and butadiene in an aqueous emulsion system containing as modifier from about 0.3 to 0.5 part per one hundred parts of monomers of a mixture of essentially equal parts by weight of decyl and undecyl mercaptans, said mercaptans consisting essentially of secondary and tertiary mercaptans.

References Cited by the Examiner
UNITED STATES PATENTS

| | | | |
|---|---|---|---|
| 2,494,326 | 1/1950 | Arundale | 260—82.7 |
| 2,549,961 | 4/1951 | Crouch et al. | 260—84.3 |

JOSEPH L. SCHOFER, *Primary Examiner.*

M. LIEBMAN, LEON J. BERCOVITZ, *Examiners.*